April 8, 1969  W. ESPIG  3,437,026
PHOTOGRAPHIC SHUTTER WITH ELECTRONIC TIMING CIRCUIT
Filed Nov. 3, 1965

INVENTOR.
Winfried Espig
BY
Arthur A. March
ATTORNEYS

United States Patent Office 3,437,026
Patented Apr. 8, 1969

3,437,026
PHOTOGRAPHIC SHUTTER WITH ELECTRONIC TIMING CIRCUIT
Winfried Espig, Calmbach, Black Forest, Germany, assignor to Prontor-Werk Alfred Gauthier, G.m.b.H., Calmbach, Black Forest, Germany, a corporation of Germany
Filed Nov. 3, 1965, Ser. No. 506,190
Claims priority, application Germany, Nov. 4, 1964, G 41,938
Int. Cl. G03b 9/58
U.S. Cl. 95—53                    5 Claims

ABSTRACT OF THE DISCLOSURE

A photographic shutter that has an electronic timing circuit wherein a first contact switch is provided that is coupled to the release member of the shutter. The first switch controls the functional state of the timing circuit and a second contact switch is provided which is connected in parallel with the first switch and actuated by the shutter drive mechanism.

---

This invention relates to a photographic shutter with an electronic timing circuit that responds to the action of a switch coupled to and actuated by the shutter release member.

Heretofore, shutters equipped with timing circuits have been arranged so that the switch which controls the timing circuit is reopened upon release of the shutter-release member. As a result, the timing circuit functions only as long as the shutter release member remains depressed. This implies that when the photographer carries out exposures with relatively long exposure times, he is obliged to depress the shutter-release member at least until the shutter function is terminated. This disadvantage has the effect that the commonly known shutter construction is unable to operate in conjunction with a delayed-action device or self-timer.

Attempts have been made to overcome this problem by coupling a relay to the release member so that the relay becomes deenergized only after the elapse of the timing signal from the circuit associated with the camera. This approach, however, involves substantial complexity in the form of structural members, and is otherwise unsatisfactory since the relay can be empolyed only in conjunction with timing circuits that include an RC network.

Attempts have also been made to associate with the contact switch in the preceding type of shutters, a locking device which holds the switch closed upon depression of the shutter release member, until the exposure period is terminated. Such a locking device, however, requires several structural members which are often difficult to accommodate in the shutter, since the available space is generally very limited.

It is therefore an object of the present invention to provide a shutter having an electronic timing circuit, with a simple device which assures that the timing circuit may fully exercise its function, even when the photographer carries out exposures in which the release member becomes released before the actual shutter function is completed. It is intended that this device not interfere with the shutter construction.

To accomplish this object, the present invention provides a switch in addition to the contact switch that can be actuated by the shutter release member. This additional or second switch is connected in parallel to the first one, and can be actuated by the shutter drive mechanism. The application of this additional switch gives dependable assurance that the electronic timing circuit remains functional even though the release member is released before the completion of the shutter function. The dimensions of the switch are quite small, and can therefore be installed readily in any shutter without structural changes.

It is another object of the present invention to provide a construction in the form of a contact pin and a leaf spring for the preceding additional switch. A driving pin fixed on the shutter blade driving ring is also provided. This driving pin is associated with the leaf spring in such a manner, that the leaf spring is lifted off its contact pin in the normal position of the ring. By following the driving pin however, the leaf spring engages the contact pin at the start of the executing motion of the ring. Aside from its simple structure, this switch arrangement has the advantage that it does not effect the functioning of the shutter.

Other objects and advantages are set forth in greater detail in the following specification taken in conjunction with accompanying drawings in which.

Figure 1:
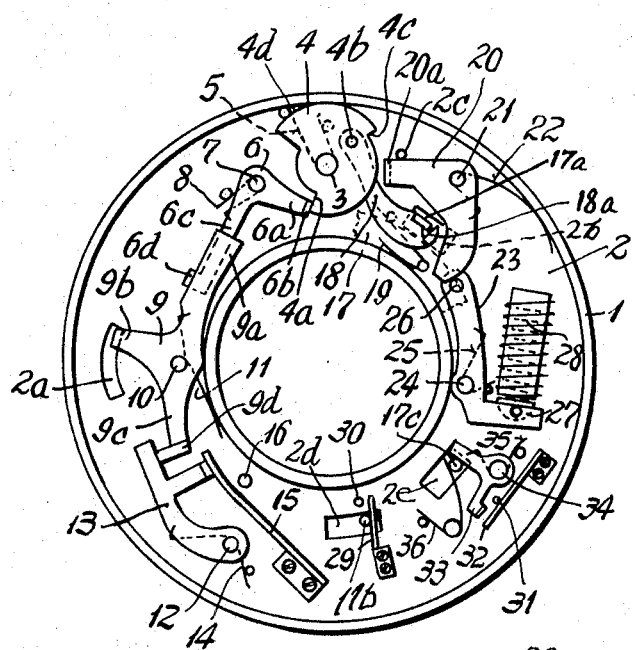
FIGURE 1 is a top view of a photographic intra-lens shutter controllable by means of an electronic timing circuit.
Figure 2:
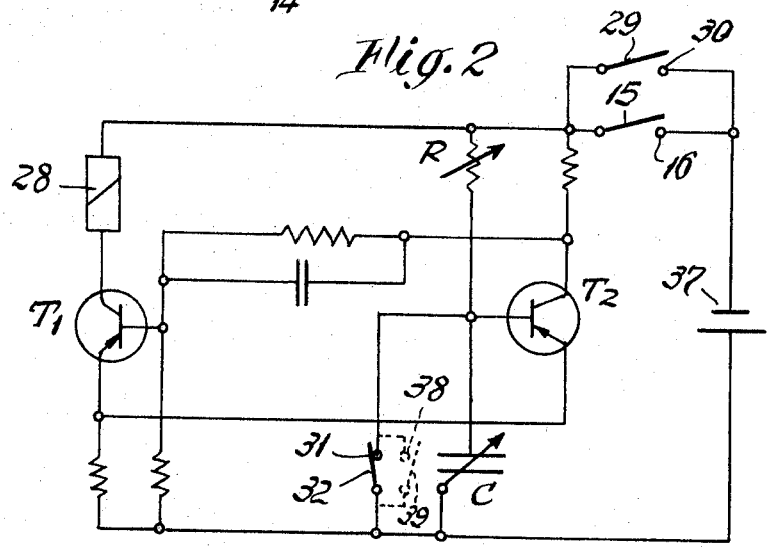
FIGURE 2 is a wiring diagram of the electronic timing circuit.

In accordance with FIGURES 1 and 2, the housing 1 of a photographic intra-lens shutter has fixed to it, a base plate 2 which serves to position in a commonly known manner, the various members of the shutter mechanism. A shaft 3 may be rotatably held in the base plate 2. One end of the shaft 3 carries the driving disc 4 of the shutter, while the other and free end of the shaft is led out from the rear of the shutter housing 1, and may be coupled to the film transport device of the camera for the purpose of cocking the driving disc 4. Arranged on the shaft 3, is a driving spring 5 which exerts a clockwise torque on the driving disc.

In order to hold the driving disc 4 in the cocked position as shown in FIGURE 1, arresting lever 6 is provided which is rotatably mounted on the shaft 7. Coil spring 8 tends to rotate the lever in counterclockwise direction. The arresting lever 6 has an arm 6a which engages by means of a bent-up lug 6b, a projection 4a of the driving disc 4 when the latter is in the cocked position. A second lever arm 6c of the arresting lever 6 has its free end 6d also bent up and cooperates with a release lever 9 whose arm 9a projects into the path of motion of the arm 6c. The release lever 9 is rotatably mounted on a shaft 10 fixed to base plate 2, and can be forced in clockwise direction by a return spring 11 mounted on the shaft 10. The lever arm 9b of the release lever 9 is bent up at right angle, and is led out from the rear of the shutter housing by a slot 2a located in the base plate 2. In the manner commonly known, the arm 9b is functionally linked to the camera release member (not shown in the drawing). The other arm 9c of the release lever 9 is provided at its end, with a bent-up lug 9d which sustains the pressure of actuating lever 13, as a result of the action of spring 14. Lever 13 is rotatably mounted on shaft 12.

The actuating lever 13 may, in turn, cooperate with a contact spring 15 of a switch. The contact spring or spring blade is fixed to the base plate 2, and may be caused to engage a fixed contact pin 16. A device for obtaining different exposure times may, for example, be electronically operated by means of the contact switch 15–16.

FIGURE 1 shows a ring 17 used for driving the shutter blades, as rotatably mounted beyond the base plate 2, and perpendicular to the plane of the page. In order to actuate the driving ring 17, a driving pawl 18 is articulately connected to the driving disc 4 by means of pivot 4b. At the free end of driving pawl 18, is a coupling jaw 18a cooperating with a bent-up lug 17a of the driving ring 17. A spring 19 acting on the driving pawl 18, assures constant engagement of the pawl 18 with lug 17a which moves within a slot 2b of the base plate 2.

For the purpose of obtaining exposure times of different duration, the preceding shutter arrangement is provided with an electronic timing circuit which blocks the shutter blade drive in its open position for a longer or shorter perod of time. For this purpose, the released driving disc 4 is intercepted by an electromagnetically controlled arresting lever 20. The driving disc impinges with an edge 4c, on the bent-up lug 20a of the arresting lever 20. The latter is, in turn, rotatably mounted on a pin 21, and is acted upon by a spring 22 which causes the arresting lever to engage a fixed pin 2c. In order to keep the arresting lever 20 in the locking position shown in FIGURE 1, a two-armed supporting lever 23 is provided which is mounted on a pin 24 of the base-plate 2. Lever 23 is subjected to counterclockwise rotation through the action of coil spring 25. At one end, the supporting lever 23 carries a pin 26 which serves to bear against arresting lever 20 upon impingement of driving disc 4. The other end of the supporting lever 23 is provided with an articulated piece 27, which forms the armature of an electromagnet 28.

The arresting lever 20 is able to block the turning down or executing motion of driving disc 4 only when the lever 20 bears against lever 23. This blocking action is possible only as long as the electromagnet 28 is supplied with current so that supporting lever 23 is retained in the position shown in FIGURE 1. If, on the other hand, electromagnet 28 is deenergized, the driving disc 4 is able to rotate clockwise by pivoting the arresting lever 20 and supporting lever 23, with its edge 4c. During this motion, the bent-up lug 20a slides off on the concentric peripheral member 4d of the driving disc 4.

The aforementioned switch 15–16, can be actuated by lever 13, so as to supply electromagnet 28 with electric current. The actuation of the switch at the same moment that the release lever 9 is depressed, assures that the magnet 28 has actually attracted the armature 27 when the shutter blades reach the open position. This is because of a sufficiently long interval exists between the closing of the switch and the open position of the shutter blades, within which electromagnet 28 can be energized and lever 20 can be secured in its functional position due to the attraction of the armature.

In contrast to spring 11, spring 14 acting on lever 13 is adjusted so that it (spring 14), can be overcome by the spring 11 when the release lever is not depressed. In this manner contact spring 15 remains undepressed. This method of adjusting springs 11 and 14 relative to one another and operating in conjunction with the contact spring 15 and release lever 19, may bring about the result, for example, that upon carrying out exposures with comparatively long exposure times, the contact spring 15 is lifted off the contact pin 16 due to the release of lever 9. This would cause the flow of current through electromagnet 28 to become interrupted before the desired exposure time has expired, and would result in an exposure time shorter than the one actuating set.

In order to assure that the release of the shutter has no influence whatsoever on the flow of current through electromagnet 28, this invention provides for a switch in addition to the one composed of parts 15 and 16. This second switch is arranged with the first one so that they are connected in parallel, and so that this second switch is open when the shutter occupies its normal position. This second switch may be constructed of a leaf spring 29 and a contact pin 30. In addition, a driving pin 17b, fixed to the driving ring 17 and movable in a slot 2d of base plate 2, may be associated with the leaf spring 29. The arrangement may be such that the leaf spring 29 is lifted off pin 30 in the normal position of the driving ring 17. At the same time leaf spring 29 following the driving pin 17b, is able to engage the pin at the start of the executing motion of the ring.

In addition to the two aforementioned contact switches, the shutter has still a third contact switch which forms part of the electronic timing circuit (to be described in detail below). This third switch is closed in the idle position of the shutter, and is opened when the shutter starts to go through its executing motion. This switch consists of a contact pin 31 mounted on the base plate 2, and of a contact spring 32 which is also fixed to the base plate. The contact spring is actuated by a bell crank lever 33 which is rotatable about a pin 34 of the base plate 2. The lever is subject to counterclockwise rotation due to the action of spring 35. This spring causes one arm of the lever 33 to engage driving pin 17c in the idle position of the shutter. The pin 17c is guided by a slot 2e in the base plate 2, while the other arm of the lever 33 cooperates with the contact spring 32. A closing spring 36 which acts opposite to the spring 35 of lever 33, acts on the pin of driving ring 17. The closing spring 36 is included to prevent the shutter blades from executing an opening motion, while the driving disc 4 is being cocked.

The control over electromagnet 28 is exercised by the aforementioned electronic timing circuit which, in accordance with the wiring diagram of FIGURE 2, is the commonly known monostable multivibrator circuit. This circuit produces a time-delay depending on the resistor and capacitor combination. In this diagram the contact switch actuated by release lever 9, and the contact switches cooperating with the shutter blade actuating ring 17 are designated with the reference numerals 15, 16; 29, 30; and 31, 32; corresponding to those of FIGURE 1.

The electromagnet 28 is energized by the series transistor $T_1$. The power supply 37 serves to activate the circuit. Variable capacitor C, a second transistor $T_2$, and adjustable resistor R serve to control the state of transistor $T_1$. The resistor R and the capacitor C form the time constant or time delay of the circuit. Biasing resistors and capacitors which are not designated in the wiring diagram, serve to complete the circuit.

The preceding electronically controlled shutter operates in the following manner:

Upon depression of the release lever 9, the contact switch 15–16 is first closed by means of a lever 13. This is before the arresting lever 6 releases the cocked driving disc of the shutter for the executing motion. The closing of the switch 15–16 cause transistor $T_1$ to become conductive while transistor $T_2$ is blocked. The flow of current through transistor $T_1$ energizes electromagnet 28 so as to attract armature 27, and thereby secure arresting lever 20 in the position shown in FIGURE 1.

The subsequent release of the driving disc 4 causes the executing motion of the shutter to begin, whereby leaf spring 29 following driving pin 17b, is able to engage the pin 30. The closing of switch 29–30 occurs at a moment within the period that the photographer depresses the release lever 9 and thereby closes switch 15–16. Consequently, the flow of current through magnet 28 is maintained by means of switch 29–30, even after the release of lever 9 and the opening of switch 15–16. As the course of the shutter motion proceeds, the contact switch 31–32 is opened by the actuating lever 33. This allows the capacitor C to become charged.

Corresponding to the open position of the shutter blades, the driving disc 4 impinges with its edge 4c on the bent-up lug 20a of the arresting lever 20. This interrupts the executing motion of the driving disc 4. Consequently, the shutter remains open until the electromagnet 28 is deenergized. This occurs when capacitor C is charged to such a degree that transistor $T_2$ connected to the capacitor C becomes conductive. At that moment, due to the feedback coupling of the two transistors $T_1$ and $T_2$, the current in transistor $T_2$ increases rapidly, thereby causing transistor $T_1$ to cease conducting. As a result, electromagnet 28 becomes deenergized and armature 27 is released. Since arresting lever 20 is thereby no longer locked in position by supporting lever 23, the driving disc 4 is able to rotate the arresting lever. The driving disc can thus continue its executing motion and simultaneously close the shutter blades. Shortly before the driving disc or the shutter blade actuating ring 17 reaches the non-operative position, contact switch 29–30 is reopened, and contact switch 31–32 is closed.

The resistor R and capacitor C shown in the wiring diagram of FIGURE 2, are variable and may be set to desired values. For example, the resistor R may be in the form of a potentiometer and may cooperate with an exposure time setting member (not shown in the drawing) which makes it possible to obtain different exposure times. The variable capacitor C may serve to preselect specific diaphragm apertures, or to take into account different film speeds. If, in such a case, the resistor R is constituted of a photoconductive cell, the preceding shutter arrangement makes it possible to realize automatic setting of exposure time after preselection of the diaphragm.

The shutter arrangement described above, can also be used in those cases in which the executing motion of the shutter drive mechanism is first braked or decelerated by a delayed-action mechanism, after the release lever 9 has been actuated. In this application it is advisable to arrange driving pin 17b relative to contact switch 29–30 so that the latter is closed by the short motion which the driving mechanism executes after the driving disc has been released, and until the disc is stopped by the delayed-action mechanism, i.e., before the shutter blades start to execute the opening motion. This has the effect that the flow of current through magnet 28 is maintained constant after the release lever 9 has been depressed, even when operating with a delayed-action device. The preceding device can be used in all shutters which are associated with delayed-action devices, and in which the release is dependent upon the release of the shutter drive mechanism. In addition, the device can be used in slotted (rotary disc, roller-blind, slit-type) shutters, inter-lens shutters, and (slide-bar) shutters.

In order to make it possible to carry out B-exposures with the shutter arrangement described above, another contact switch 38–39 may be provided in addition to the contact switch 31–32. This additional switch may be connected in parallel to the switch 31–32 and become closed when the exposure time setting member (not shown in the drawing) is set to B. The charging of capacitor C can be avoided with the contact switch 38–39 so that the exposure time of the shutter is determined exclusively by the interval during which the release lever 9 is held in the release position.

While this invention has been described in some detail, it will be understood by those skilled in the art that variations and modifications may be made without departing from the spirit thereof or the scope of the following claims.

What is claimed is:

1. A photographic shutter with electronic timing circuit comprising: a first contact switch coupled to the release member of said shutter, said switch controlling the functional state of said timing circuit; a second contact switch connected in parallel with said first switch and actuated by the shutter drive mechanism, said switch comprising a leaf spring and a contact pin; and a driving pin fixed to the shutter blade driving ring, said driving pin being associated with said leaf spring so that the leaf spring is lifted off said contact pin when said ring is in its normal position, and said leaf spring following said driving pin and engaging said contact pin at the start of the executing motion of said ring.

2. The photographic shutter of claim 1 wherein said second switch comprises a normally open switch.

3. The photographic shutter of claim 2 wherein said switch spring is separated from said contact pin in the normal state of the switch.

4. The photographic shutter of claim 2 wherein said first and second switches each have a contact pin and a leaf spring and wherein said springs are separated from their respective contact pins in the normal state of said switches.

5. The photographic shutter of claim 1 wherein said second switch comprises a single-pole, single-throw switch.

References Cited

UNITED STATES PATENTS

| | | | |
|---|---|---|---|
| 2,125,388 | 8/1938 | Monroe | 95—1.1 |
| 3,043,203 | 7/1962 | Buhrle | 95—63 X |
| 3,063,354 | 11/1962 | Matulik | 95—53 X |
| 3,135,181 | 6/1964 | Gevatter | 95—53 X |

JOHN M. HORAN, *Primary Examiner.*